No. 638,231. Patented Dec. 5, 1899.
M. L. FLYNN & J. A. SHERMAN.
HINGED COUPLING FOR LOCOMOTIVES.
(Application filed June 7, 1899.)

(No Model.) 2 Sheets—Sheet 1.

WITNESSES:
L. M. Billings.
G. A. Neubauer.

INVENTORS.
Michael L. Flynn, and
James A. Sherman.
By A. J. Sangster
ATTORNEY.

THE NORRIS PETERS CO., PHOTO-LITHO., WASHINGTON, D. C.

No. 638,231. Patented Dec. 5, 1899.
M. L. FLYNN & J. A. SHERMAN.
HINGED COUPLING FOR LOCOMOTIVES.
(Application filed June 7, 1899.)
(No Model.) 2 Sheets—Sheet 2.
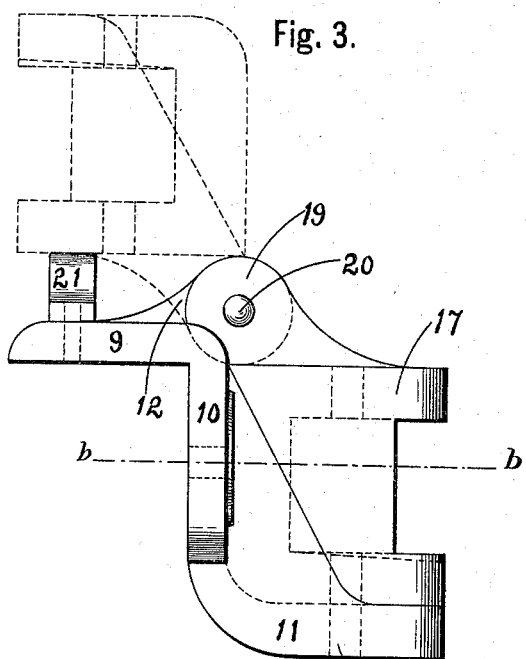
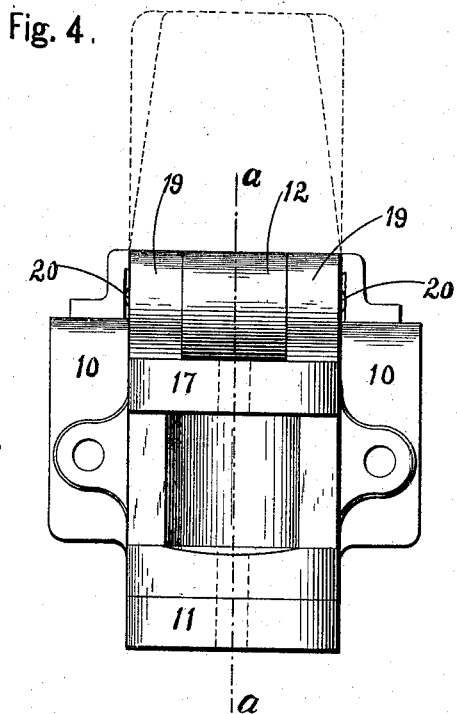
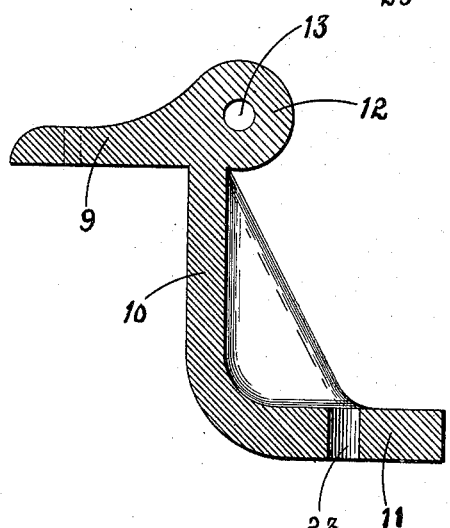
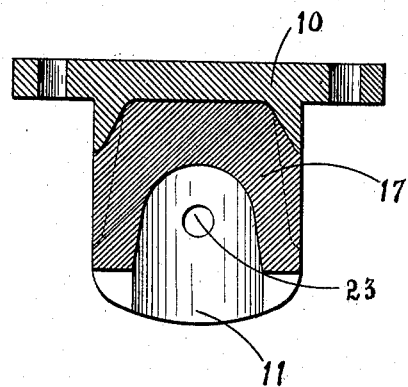
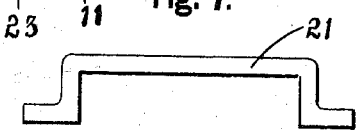
WITNESSES:
L. M. Dillinger.
L. A. Neubauer.
INVENTORS.
Michael L. Flynn and
James A. Sherman.
BY
A. J. Sangster
ATTORNEY.
THE NORRIS PETERS CO., PHOTO-LITHO., WASHINGTON, D. C.

UNITED STATES PATENT OFFICE.

MICHAEL L. FLYNN AND JAMES A. SHERMAN, OF ST. THOMAS, CANADA.

HINGED COUPLING FOR LOCOMOTIVES.

SPECIFICATION forming part of Letters Patent No. 638,231, dated December 5, 1899.

Application filed June 7, 1899. Serial No. 719,690. (No model.)

*To all whom it may concern:*

Be it known that we, MICHAEL L. FLYNN and JAMES A. SHERMAN, subjects of the Queen of Great Britain, residing at St. Thomas, in the county of Elgin, Province of Ontario, and Dominion of Canada, have invented certain new and useful Improvements in Hinged Couplings for Locomotives, of which the following is a specification.

This invention relates to an improved coupling which is principally adapted for attachment to the front of a locomotive; and the object of the invention is to attach a base member to the locomotive-front and hinge or pivot a coupling member to said base member, so that it can be turned out of the way when not in use without removing or detaching any of the parts from the locomotive, the base member serving to support the coupling member in coupling position.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1:
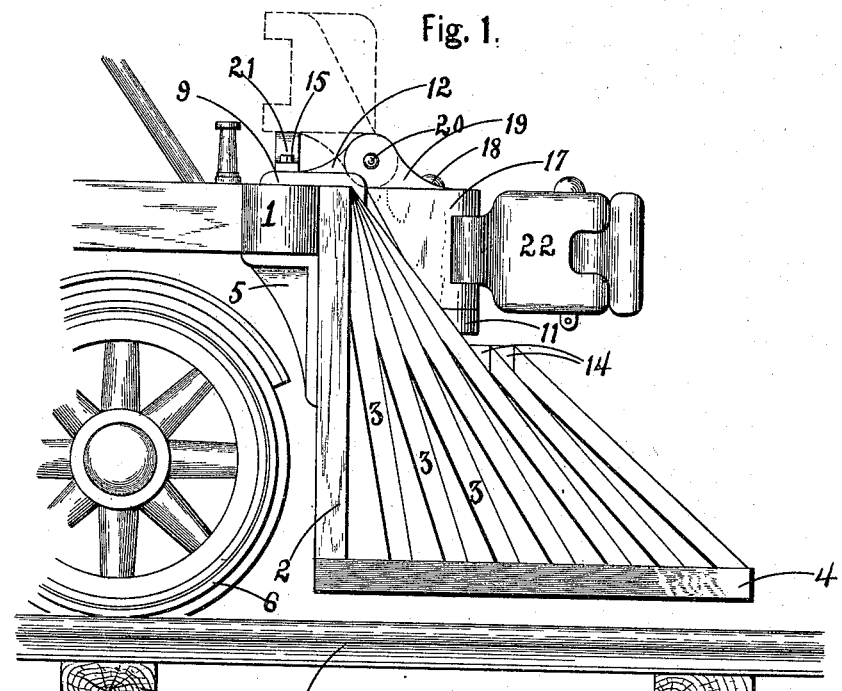
Figure 2:
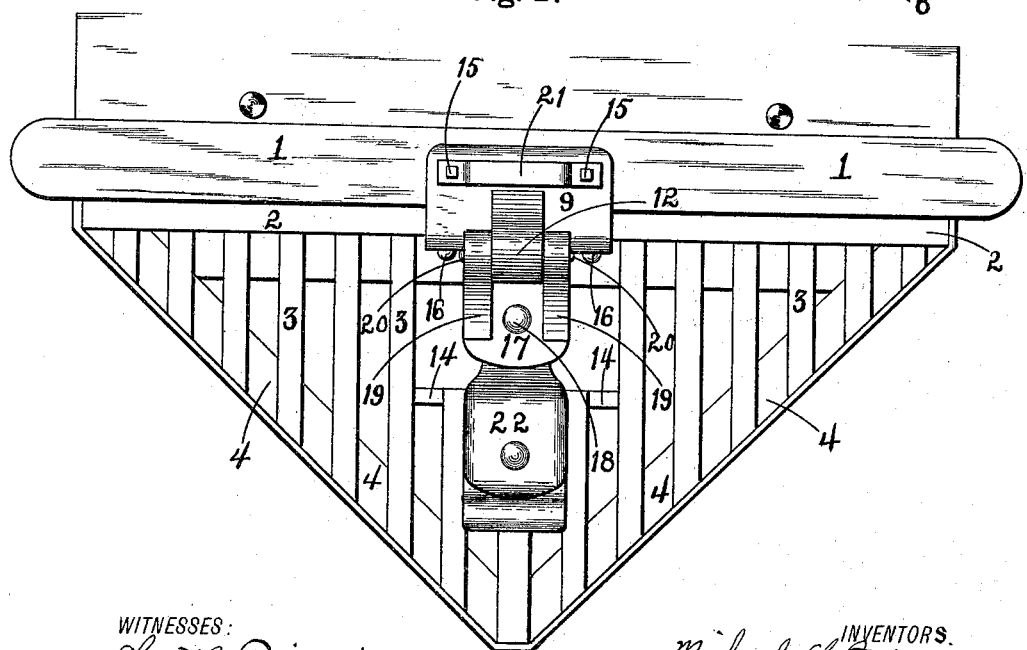

Figure 1 represents a side elevation of a portion of a locomotive having the improved coupler attached thereto, illustrating the coupler in its coupling position in full lines and in its turned-out-of-the-way position in dotted lines. Fig. 2 represents a top plan view of the same. Fig. 3 is an enlarged side elevation of the coupling, the hinged coupling member being shown in its coupling position in full lines and turned back out of the way in dotted lines. Fig. 4 is an enlarged front view of the same. Fig. 5 is a section through the base member on or about line *a a*, Fig. 4. Fig. 6 is a section on or about line *b b*, Fig. 3. Fig. 7 is a side elevation of the support.

In referring to the drawings for the details of construction like numerals designate like parts.

For the purpose of fully explaining the invention a preferred construction has been illustrated attached to the front of a locomotive of the ordinary type, 1 representing the bumper or buffer beam, 2 the pilot-frame, 3 the pilot-bars, 4 the pilot-bottom band, 5 the pilot-bracket, and 6 the wheels of the portion of the locomotive shown. A portion of a rail 7 and its supporting-ties 8 are also shown.

The coupling is composed of a base member, which is rigidly secured to the buffer-beam by bolts, and a coupling member, which is hinged or pivoted to said base member, so that it is supported thereon in coupling position and may be turned back out of the way when not in use. The base member is preferably formed as shown in the drawings, having a horizontal top portion 9, an intermediate portion 10, which projects vertically downward from the front of the top portion 9, and a bottom portion 11, which extends horizontally outward from the lower end of the intermediate portion 10. A pivotal lug or ear 12, forming a hinge portion, extends outwardly from the base member, preferably the top portion thereof, and is provided with a transverse horizontal opening 13. (Shown in Fig. 5.) The base member is preferably secured to the front of the locomotive by cutting away or removing a portion of the upper part of the middle pilot-bars 4, substantially as shown in Fig. 2, the upper ends of the remaining portion of the bars being firmly braced by the transverse or cross bars 14, seating the base in the space thus formed with its top portion 9 upon the top of the bumper or buffer beam 1 and the pilot-frame and its intermediate portion against the front side of the top portion of the pilot-frame and firmly fastening it in place with top and side bolts or rivets 15 and 16.

The body 17 of the coupling member has a depression for the introduction of the opposite link or coupling device and a vertical opening through which the locking-pin 18 is passed.

A vertical opening 23 is provided in the lower horizontal portion 11 of the base member, which registers with the vertical opening through the body 17 of the coupling member when the coupling member is supported in coupling position upon the base, substantially as shown in dotted lines in Fig. 3, and as the lower end of the locking-pin extends into said opening 23 in the lower portion 11 of the base the pin not only serves to lock the coupling to a companion coupler, but also to fasten the coupling member to the base member against a pivotal or folding movement.

A pair of lugs or ears 19 extend back from the top of the body 17 and are provided with transverse horizontal openings that register with the opening 13 through the lug 12 when said lug is properly placed in its interposed position between the lugs 19, a hinge-pin 20 being passed through all of said openings to pivot the coupling member to the base member.

The rear surface of the body of the coupling member is preferably convexed, and the outer surface of the intermediate portion 10 of the base is correspondingly rounded or concaved to form a concave seat for the coupling member when in its operative position and prevent any side or lateral movement.

A support 21, formed substantially as shown in Fig. 7, is bolted upon the top portion 9 of the base member and to the bumper or buffer beam, preferably by the same bolts that secure the top portion of the base member thereto, and serves to support the coupling member when turned out of the way, substantially as shown in dotted lines in Fig. 1.

22 represents a coupler secured to the coupling member, which may form a part of a coupling attached to a car or may be an independent coupling-section employed to connect the coupling member on the locomotive to a car-coupler.

As the coupling member is extremely rigid in its position when seated in coupling position upon the base member, it is advisable to use a supplementary independent coupling-section, such as 22, to allow sufficient lateral movement to provide for the swaying of the locomotive and cars.

The base member and the coupling member and their various accessories are preferably cast of iron or other suitable metal, although they may be formed in any way well known to the trade.

The operation of this improved device will be easily understood from the foregoing description and the accompanying drawings, the coupler being folded back out of the way when not required for use, substantially as shown in dotted lines in Fig. 1. The principal advantage is that when folded back the improved coupling is less liable to injure stock struck by the locomotive than the projecting coupling employed and serves as a protection for the front end of the locomotive when striking stock or other obstructions.

The improved device is adapted to be attached to the rear of a locomotive or to be employed on railway-cars or the like in lieu of the ordinary coupler and possesses the advantage of folding back out of the way when not in use.

We claim as our invention—

1. A coupling device comprising a base member adapted to be secured to the front of a locomotive and having a concave supporting-seat, and a coupling member hinged to said member and having a corresponding convex surface fitting in the concave seat, as set forth.

2. A coupling device comprising a base member adapted to be secured to the front of a locomotive and having a top horizontal portion, an intermediate vertical portion, a bottom horizontal portion and a hinge portion, bolts for fastening the base to the front of a locomotive and a coupling member having a body and hinge devices pivoted to the hinge portion of the base and adapted to be supported in coupling position in said body against lateral displacement.

3. A coupling device comprising a base member having a top horizontal portion, an intermediate portion extending vertically downward from the outer extreme of the top portion and provided with a concaved outer surface, a bottom horizontal portion projecting forward from the lower extreme of the intermediate portion, and an ear or lug extending forward from the top portion, a coupling member having a body portion provided with a depression for receiving the link or locking part of another coupling and a pair of hinge ears or lugs between which the lug or ear of the base member is placed and a hinge-pin passed through said ears or lugs, as set forth.

4. A coupling device comprising a base member having a top horizontal portion, an intermediate portion extending vertically downward from the outer extreme of the top portion and provided with a concaved outer surface, a bottom horizontal portion projecting forward from the lower extreme of the intermediate portion and having a vertical opening, and an ear or lug extending forward from the top portion, a coupling member having a body portion provided with a longitudinal depression for receiving the link or locking part of another coupling and a vertical opening, and a pair of hinge ears or lugs between which the lug or ear of the base member is placed, a hinge-pin passed through said ears or lugs, and a locking-pin passed through the vertical openings in the base and coupling members when in coupling position, as set forth.

5. The combination with a beam attached to a locomotive or the like, of a base member, a coupling member movably secured to said base member, a support for supporting the coupling member when turned from its coupling position, and bolts passing through said support, base member and beam for securing them together, as set forth.

6. The combination with a locomotive having a portion of the upper pilot-bars removed, of a base member rigidly secured in said portion and having a concaved seat and upper outwardly-extending ears forming hinge portions and a coupling member hinged to said hinge portions and adapted to be supported in coupling position in the concaved seat, as set forth.

7. A coupling device comprising a base member adapted to be fastened to a locomotive and having an opening, a coupling member hinged to said base member having an opening registering with the opening in the base member when in coupling position, a supplementary coupler and a locking-pin passing through said openings and the supplementary coupler for fastening the coupling member to the base member and the supplementary coupler to the coupling member.

8. The combination with a locomotive having a buffer-beam and a pilot-frame, of a base member secured to said locomotive with its top horizontal portion against the buffer-beam, its intermediate vertical portion against the front of the pilot-frame, and its lower portion projecting horizontally outward, a coupling member hinged to said base member and supported by said base member in coupling position, and a support for supporting the coupling member when turned from its coupling position, as set forth.

MICHAEL L. FLYNN.
JAMES A. SHERMAN.

Witnesses:
E. HORTON,
MARY HORTON.